United States Patent
Koripelly et al.

(10) Patent No.: US 11,345,645 B2
(45) Date of Patent: May 31, 2022

(54) ENHANCED EFFICIENCY FERTILIZER WITH EMBEDDED POWDER COMPOSITION

(71) Applicant: SABIC GLOBAL TECHNOLOGIES B.V., Bergen op Zoom (NL)

(72) Inventors: Rajamalleswaramma Koripelly, Bangalore (IN); Ravi Hegde, Bangalore (IN); Chandra Mohana, Bangalore (IN); Radha Achanath, Bangalore (IN); Samik Gupta, Bangalore (IN); Sabeshan Kanagalingam, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/605,913

(22) PCT Filed: Apr. 12, 2018

(86) PCT No.: PCT/IB2018/052578
§ 371 (c)(1),
(2) Date: Oct. 17, 2019

(87) PCT Pub. No.: WO2018/193345
PCT Pub. Date: Oct. 25, 2018

(65) Prior Publication Data
US 2020/0039893 A1    Feb. 6, 2020

Related U.S. Application Data

(60) Provisional application No. 62/487,731, filed on Apr. 20, 2017.

(51) Int. Cl.
*C05G 3/90*    (2020.01)
*C05C 9/00*    (2006.01)

(52) U.S. Cl.
CPC .............. *C05C 9/005* (2013.01); *C05G 3/90* (2020.02)

(58) Field of Classification Search
CPC .. C05C 9/005; C05G 3/90; C05G 5/10; C05G 5/12; C05G 5/40; Y02P 60/21
See application file for complete search history.

(56) References Cited

U.S. PATENT DOCUMENTS 3,056,723 A    10/1962    Galloway
3,232,740 A    2/1966    Sor et al.
(Continued)

FOREIGN PATENT DOCUMENTS

AU    667645    2/1995
AU    2015212412    9/2016
(Continued)

OTHER PUBLICATIONS

Taylor, "All You Need to Know About Soils", 2017, accessed from bobvila.com (Year: 2017).*
(Continued)

*Primary Examiner* — Jennifer A Smith
(74) *Attorney, Agent, or Firm* — Norton Rose Fulbright US LLP

(57) ABSTRACT

Fertilizer particles described herein include a powder composition that can contain one or more urease inhibitors and/or nitrification inhibitors and a filler material embedded within a solid urea matrix. Methods of producing the fertilizer particles involve contacting a powder composition that can contain one or more urease inhibitors and/or nitrification inhibitors and a filler with molten urea under conditions sufficient to form a fertilizer particle having the powder composition embedded within a solid urea matrix.

19 Claims, 2 Drawing Sheets

(56) References Cited

U.S. PATENT DOCUMENTS

| | | |
|---|---|---|
| 3,300,294 A | 1/1967 | Hollstein |
| 3,314,778 A | 4/1967 | Campbell et al. |
| 3,322,528 A | 5/1967 | Hamamoto |
| 3,326,665 A | 7/1967 | Schäfer et al. |
| 3,331,677 A | 7/1967 | Campbell et al. |
| 3,388,989 A | 6/1968 | Sor |
| 3,400,011 A | 9/1968 | Fox |
| 3,441,539 A | 4/1969 | Schafer et al. |
| 3,499,748 A | 3/1970 | Fraser |
| 3,825,414 A | 6/1974 | Lee et al. |
| 3,870,755 A | 3/1975 | Kamo et al. |
| 3,954,436 A | 5/1976 | Vad et al. |
| 3,961,329 A | 7/1976 | Naidich |
| 3,962,329 A | 7/1976 | Schoenaich et al. |
| 4,062,890 A | 12/1977 | Shank |
| 4,082,533 A | 4/1978 | Wittenbrook et al. |
| 4,880,455 A | 11/1989 | Blank |
| 4,994,100 A | 2/1991 | Sutton et al. |
| 5,124,451 A | 7/1992 | Hackl et al. |
| 5,169,954 A | 12/1992 | Hackl et al. |
| 5,219,465 A | 6/1993 | Goertz et al. |
| 5,264,019 A | 11/1993 | Gossett, Jr. et al. |
| 5,300,135 A | 4/1994 | Hudson et al. |
| 5,352,265 A | 10/1994 | Weston et al. |
| 5,399,186 A | 3/1995 | Derrah et al. |
| 5,405,426 A | 4/1995 | Timmons |
| 5,414,083 A | 5/1995 | Hackl et al. |
| 5,466,274 A | 11/1995 | Hudson et al. |
| 5,476,528 A | 12/1995 | Trimm |
| 5,597,917 A | 1/1997 | Hackl et al. |
| 5,645,624 A | 7/1997 | Naka et al. |
| 5,741,521 A | 4/1998 | Knight et al. |
| 5,803,946 A | 9/1998 | Petcavich et al. |
| 5,851,261 A | 12/1998 | Markusch et al. |
| 5,862,610 A | 1/1999 | Lipert |
| 5,917,110 A | 6/1999 | Kust |
| 5,976,210 A | 11/1999 | Sensibaugh |
| 6,048,376 A | 4/2000 | Miller |
| 6,048,378 A | 4/2000 | Moore |
| 6,231,633 B1 | 5/2001 | Hirano et al. |
| 6,391,454 B1 | 5/2002 | Mao et al. |
| 6,500,223 B1 | 12/2002 | Sakai et al. |
| 6,576,035 B2 | 6/2003 | Hartmann et al. |
| 6,749,659 B1 | 6/2004 | Yu et al. |
| 6,900,162 B2 | 5/2005 | Wertz et al. |
| 6,936,573 B2 | 8/2005 | Wertz et al. |
| 6,936,681 B1 | 8/2005 | Wertz et al. |
| 7,213,367 B2 | 5/2007 | Wertz et al. |
| 8,163,058 B2 | 4/2012 | Whitehurst |
| 8,419,819 B2 | 4/2013 | Sutton |
| 8,603,211 B2 | 12/2013 | Rahn et al. |
| 9,034,072 B2 | 5/2015 | Gabrielson et al. |
| 9,376,350 B2 | 6/2016 | Pursell et al. |
| 9,394,210 B2 | 7/2016 | Gabrielson et al. |
| 9,422,203 B2 | 8/2016 | Waliwitiya |
| 9,446,993 B2 | 9/2016 | Li et al. |
| 2003/0224031 A1 | 12/2003 | Heier et al. |
| 2004/0001884 A1 | 1/2004 | Moroni et al. |
| 2004/0016275 A1 | 1/2004 | Hartmann et al. |
| 2004/0016276 A1 | 1/2004 | Wynnyk et al. |
| 2004/0050127 A1 | 3/2004 | Ambri |
| 2004/0163434 A1 | 8/2004 | Quin |
| 2004/0182953 A1 | 9/2004 | Knoer |
| 2006/0089259 A1 | 4/2006 | Driessen et al. |
| 2006/0142157 A1 | 6/2006 | Birthisel et al. |
| 2009/0270257 A1 | 10/2009 | Pursell et al. |
| 2009/0317468 A1 | 12/2009 | Letmathe et al. |
| 2010/0011825 A1 | 1/2010 | Ogle et al. |
| 2010/0139348 A1 | 6/2010 | Wan et al. |
| 2011/0036009 A1 | 2/2011 | Bissonnette et al. |
| 2011/0154873 A1 | 6/2011 | Burnham et al. |
| 2011/0275520 A1 | 11/2011 | Frey et al. |
| 2012/0017659 A1 | 1/2012 | Pursell et al. |
| 2012/0067094 A1 | 3/2012 | Pursell et al. |
| 2012/0090366 A1 | 4/2012 | Pursell et al. |
| 2013/0152649 A1 | 6/2013 | Kweeder et al. |
| 2013/0231493 A1 | 9/2013 | Shishkov et al. |
| 2013/0305796 A1 | 11/2013 | Hudson et al. |
| 2014/0033779 A1 | 2/2014 | Bertin et al. |
| 2014/0047884 A1 | 2/2014 | Gabrielson et al. |
| 2014/0102156 A1 | 4/2014 | Pursell et al. |
| 2014/0223978 A1 | 8/2014 | Kuo et al. |
| 2014/0230322 A1 | 8/2014 | Zhang et al. |
| 2014/0255605 A1 | 9/2014 | Van Kaathoven et al. |
| 2015/0031786 A1 | 1/2015 | Lambeth |
| 2015/0047402 A1 | 2/2015 | Walker et al. |
| 2015/0052960 A1 | 2/2015 | Makin et al. |
| 2015/0101379 A1* | 4/2015 | Gabrielson ............... C05B 7/00 71/28 |
| 2015/0125639 A1 | 5/2015 | Rosen |
| 2015/0152017 A1 | 6/2015 | Schumski et al. |
| 2015/0197460 A1 | 7/2015 | Gabrielson et al. |
| 2015/0239790 A1 | 8/2015 | Iwig et al. |
| 2015/0291481 A1 | 10/2015 | Neff et al. |
| 2015/0299062 A1 | 10/2015 | McKnight et al. |
| 2016/0075609 A1 | 3/2016 | Gabrielson et al. |
| 2016/0076062 A1 | 3/2016 | Medoff et al. |
| 2016/0185682 A1 | 6/2016 | Katz |
| 2016/0297723 A1* | 10/2016 | Banks .................... A01N 43/12 |
| 2016/0340265 A1 | 11/2016 | Kanagalingam et al. |
| 2017/0088480 A1 | 3/2017 | Kannan et al. |
| 2017/0362139 A1 | 12/2017 | Zhang et al. |
| 2018/0022661 A1 | 1/2018 | Achille et al. |
| 2018/0208513 A1 | 7/2018 | Kanagalingam et al. |
| 2018/0208519 A1 | 7/2018 | Kanagalingam et al. |
| 2018/0297903 A1 | 10/2018 | Ledoux et al. |
| 2020/0039893 A1 | 2/2020 | Koripelly et al. |
| 2020/0131098 A1 | 4/2020 | Hegde et al. |
| 2020/0140353 A1 | 5/2020 | Hegde et al. |

FOREIGN PATENT DOCUMENTS

| | | |
|---|---|---|
| CA | 2441175 | 3/2004 |
| CA | 2701995 | 10/2011 |
| CN | 1044450 A | 8/1990 |
| CN | 1126465 | 7/1996 |
| CN | 1145059 | 3/1997 |
| CN | 1417172 A | 5/2003 |
| CN | 1666972 | 9/2005 |
| CN | 101108781 | 7/2006 |
| CN | 1298679 | 2/2007 |
| CN | 101037371 | 9/2007 |
| CN | 101134695 | 3/2008 |
| CN | 101134697 | 3/2008 |
| CN | 101177365 | 5/2008 |
| CN | 101289350 | 10/2008 |
| CN | 101289353 | 10/2008 |
| CN | 101323545 | 12/2008 |
| CN | 101384523 | 3/2009 |
| CN | 101486614 | 7/2009 |
| CN | 101628838 | 1/2010 |
| CN | 101638348 | 2/2010 |
| CN | 101723752 | 6/2010 |
| CN | 102143927 | 8/2011 |
| CN | 102267842 | 12/2011 |
| CN | 102295491 | 12/2011 |
| CN | 102432388 | 5/2012 |
| CN | 102503686 | 6/2012 |
| CN | 102557838 | 7/2012 |
| CN | 102746073 | 10/2012 |
| CN | 102826917 | 12/2012 |
| CN | 102951968 | 3/2013 |
| CN | 103319120 | 9/2013 |
| CN | 103588576 | 2/2014 |
| CN | 103755450 | 4/2014 |
| CN | 103755498 | 4/2014 |
| CN | 103772074 | 5/2014 |
| CN | 103787798 | 5/2014 |
| CN | 103833490 | 6/2014 |
| CN | 103102216 | 12/2014 |
| CN | 104177201 | 12/2014 |
| CN | 104230529 A | 12/2014 |
| CN | 104230575 | 12/2014 |
| CN | 104261723 | 1/2015 |

(56) References Cited

FOREIGN PATENT DOCUMENTS

| | | |
|---|---|---|
| CN | 104276877 | 1/2015 |
| CN | 104311366 | 1/2015 |
| CN | 104326847 | 2/2015 |
| CN | 102936169 | 4/2015 |
| CN | 104557278 | 4/2015 |
| CN | 105669332 | 6/2016 |
| DE | 1146080 | 3/1963 |
| DE | 1905834 | 11/1972 |
| DE | 142044 | 6/1980 |
| DE | 3042662 | 6/1982 |
| DE | 4128828 | 3/1993 |
| DE | 19631764 | 2/1998 |
| EP | 0047556 | 3/1982 |
| EP | 0255752 | 2/1988 |
| EP | 0491238 | 6/1992 |
| EP | 0877722 | 11/1998 |
| EP | 1043295 | 10/2000 |
| EP | 1067093 | 12/2004 |
| EP | 1724247 | 11/2006 |
| EP | 2431346 | 3/2012 |
| FR | 893153 | 6/1944 |
| FR | 1356105 | 3/1964 |
| GB | 1212605 | 11/1970 |
| GB | 1435678 | 5/1976 |
| GB | 1535807 | 12/1978 |
| JP | 348780 | 7/1991 |
| JP | HO7-033576 | 2/1995 |
| JP | H1116798 | 4/1999 |
| JP | H11263689 | 9/1999 |
| JP | H11278973 | 10/1999 |
| JP | 2001294792 | 10/2001 |
| KR | 100974639 | 8/2010 |
| KR | 101485578 | 12/2014 |
| NZ | 596113 | 8/2012 |
| SU | 429048 | 5/1974 |
| TW | 1549926 | 9/2016 |
| WO | WO 1989/000079 | 1/1989 |
| WO | WO 1995/026942 | 10/1995 |
| WO | WO 1996/018591 | 6/1996 |
| WO | WO 2003/006399 | 1/2003 |
| WO | WO 2003/045877 | 6/2003 |
| WO | WO 2003/066207 | 8/2003 |
| WO | WO 2004/047974 | 6/2004 |
| WO | WO 2004/098858 | 11/2004 |
| WO | WO 2005/075602 | 8/2005 |
| WO | WO 2006/044393 | 4/2006 |
| WO | WO 2007/022732 | 3/2007 |
| WO | WO 2007/041234 | 4/2007 |
| WO | WO 2007/086773 | 8/2007 |
| WO | WO 2013/017888 | 2/2013 |
| WO | WO 2013/019121 | 2/2013 |
| WO | WO 2013/121384 | 8/2013 |
| WO | WO 2013/128402 | 9/2013 |
| WO | WO 2014/189183 | 11/2014 |
| WO | WO 2015/001457 | 1/2015 |
| WO | WO 2015/114542 | 8/2015 |
| WO | WO 2015/170217 | 11/2015 |
| WO | WO 2016/091205 | 6/2016 |
| WO | WO 2016/107548 | 7/2016 |
| WO | WO 2016/186526 | 11/2016 |
| WO | WO 2017/013572 | 1/2017 |
| WO | WO 2017/013573 | 1/2017 |
| WO | WO 2017/081183 | 5/2017 |
| WO | WO 2017/087264 | 5/2017 |
| WO | WO 2017/087265 | 5/2017 |
| WO | WO 2017/100507 | 6/2017 |
| WO | WO 2017/137902 | 8/2017 |
| WO | WO 2017/168288 | 10/2017 |
| WO | WO 2018/162533 | 9/2018 |
| WO | WO 2018/193344 | 10/2018 |
| WO | WO 2018/193345 | 10/2018 |
| WO | WO 2018/193358 | 10/2018 |
| WO | WO 2019/030671 | 2/2019 |
| ZA | 201105819 | 4/2012 |

OTHER PUBLICATIONS

Manic Organic. "Diatomaceous Earth", 2021, accessed from manicorganicsa.com (Year: 2021).*
Hendrickson et al, "Metabolism of the Urease Inhibitor NBPT in Soils", 1993, Soil Biology and Biochemistry, vol. 25, issue 11, p. 1613 (Year: 1993).*
Engel et al, "Degradation of the Urease Inhibitor NBPT as Affected by Soil pH", 2015, Soil Science Society of America Journal, vol. 79, issue 6 (Year: 2015).*
Britannica ("Plaster of Paris", accessed from www.britannica.com) (Year: 2021).*
Dictionary.com ("Powder", accessed from www.dictionary.com) (Year: 2021).*
Styer ("Controlling Your Growing Media PH", 2009, accessed from www.growertalks.com) (Year: 2009).*
Hubbe ("Chalk", accessed from www.projects.ncsu.edu) (Year: 2021).*
Shivokevich et al ("Calcium Carbonate", accessed from www.ams.usda.gov) (Year: 2018).*
Al-Kanani et al., "Volatilization of ammonia from urea-ammonium nitrate solutions as influenced by organic and inorganic additives." *Fertilizer research* 1990, 23, 113-119.
Allison, "The enigma of soil nitrogen balance sheets," *Adv. Agro.* 1995, 7:213-250.
Al-Zahrani, S.M., "Utilization of Polyethylene and Paraffin Waxes as Controlled delivery Systems for Different Fertilizers" *Ind. Eng. Chem. Res.*, 2000, 39(2):367-371.
Bolan et al., "Soil Acidification and Liming Interactions with Nutrient and Heavy Metal Transformation and Bioavailability," *Advances in Agronomy*, 2003, 78:215-272.
Bose, et al., "New protocol for Biginelli reaction—a practical synthesis of Monastrol," *ARKIVOC*, 2005, 3:228-236.
Chien, et al., "Recent Developments of Fertilizer Production and Use to Improve Nutrient Efficiency and Minimize Environmental Impacts," *Advances in Agronomy*, 2009, 102(8):267-322.
Ciurli, et al. "Structural properties of the nickel ions in; urease: novel insights into the catalytic and inhibition mechanisms," *Coord. Chem. Rev.* 1999, 331:190-192.
Gautney, et al., "Feasibility of cogranulating the nitrogen loss inhibitors dicyandiamide, thiourea, phenyl phosphorodiamidate, and potassium ethyl xanthate with urea," *Ind. Eng. Chem. Prod. Res. Dev.*, 1984, 23:483-489.
Gioacchini, et al., "Influence of urease and nitrification inhibitors on N losses from soils fertilized with urea," *Biology and Fertility of Soils*, 2002, 36(2):129-135.
Hays, "Symposium on Controlled Release Fertilizer," *J. Agri. Food*, 1971, 19:797.
International Preliminary Report on Patentability issued in counterpart International Patent Application No. PCT/IB2015/050654, dated Aug. 2, 2016.
International Preliminary Report on Patentability issued in International Patent Application No. PCT/IB2016/054271, dated Oct. 18, 2017.
International Search Report and Written Opinion issued in counterpart International Patent Application No. PCT/IB2015/050654, dated May 19, 2015.
International Search Report and Written Opinion issued in counterpart International Patent Application No. PCT/IB2016/054271, dated Oct. 24, 2016.
International Search Report and Written Opinion issued in counterpart International Application No. PCT/IB2015/053056, dated Sep. 23, 2015.
International Search Report and Written Opinion issued in International Patent Application No. PCT/IB2018/052577, dated Aug. 1, 2018.
International Search Report and Written Opinion issued in International Patent Application No. PCT/IB2018/052578, dated Aug. 1, 2018.
International Search Report and Written Opinion issued in International Patent Application No. PCT/IB2018/052630, dated Aug. 9, 2018.

(56) References Cited

OTHER PUBLICATIONS

International Search Report and Written opinion issued in International Application No. PCT/IB2018/055946, dated Dec. 3, 2018.
International Search Report and Written Opinion issued in International Application No. PCT/IB2016/054270, dated Oct. 24, 2016.
International Search Report and Written opinion issued in International Application No. PCT/IB2017/050683, dated Jun. 20, 2017.
International Search Report and Written Opinion issued in International Patent Application No. PCT/US2016/061486, dated Jan. 25, 2017.
International Search Report and Written Opinion issued in International Patent Application No. PCT/US2016/061487, dated Jan. 5, 2017.
Jarosiewicz & Tomaszewska, "Controlled-release NPK fertilizer encapsulated by polymeric membranes." *Journal of Agricultural and Food Chemistry*, 2003, 51(2):413-417.
Kawakami, et al., "Physiological and yield responses of field-grown cotton to application of urea with the urease inhibitor NBPT and the nitrification inhibitor DCD," *European Journal of Agronomy*, 2012, 43:147-154.
Lunt, et al., "Properties and Value of 1,1-Diureido Isobutane (IBDU) as a Long-Lasting Nitrogen Fertilizer," *J. Agr. Food Chem.*, 1969, 17(6):1269-1271.
Mahmood et al., "Calcium Carbide-Based Formulations cause Slow Release of Acetylene and Ethylene in Soil and Nitrification Inhibition," *Communications in Soil Science and Plant Analysis*, 2014, 45(17): 2277-2288.
Mahmood et al., "Effect of rate and application depth matrix-I calcium carbide based formulation on growth, yield and nitrogen uptake of wheat," *African Journal of Agricultural Research*, 2011, 6(30): 6363-6398.
Mahmood et al., "Nutritional and physiological response of wheat to soil applied matrix-I formulated calcium carbide with and without nitro gen fertilizer," *Pakistan Journal of Nutrition* 2012, 11(2): 154-159.
Office Action and Search Report issued in Corresponding Taiwanese Patent Application No. 104114189, dated May 9, 2019.
Office Action issued in corresponding Chinese Patent Application No. 201580008733.2, dated Jan. 11, 2019. (Machine Translation Provided).
Office Action issued in corresponding Chinese Patent Application No. 2015800087332, dated Jun. 13, 2019.
Office Action issued in corresponding Chinese Patent Application No. 201680051745.8, dated Jul. 23, 2019.
Office Action issued in corresponding Indian Patent Application No. 201617028561, dated Jun. 18, 2019.
Office Action issued in corresponding Taiwan Patent Application No. 105122936, dated Sep. 5, 2019.
Office Action issued in European Patent Application No. 16741394.7, dated Dec. 7, 2018.
Patra, et al., "Use of urea coated with natural products to inhibit urea hydrolysis and nitrification in soil," *Biol. Fertil. Soils*, 2009, 45:617-621.
Reddy, et al., New environmentally friendly solvent free syntehesis of dihydropyrimidinones catalysed by N-butyl-N, N-dimethylphenylethylammonium bromide, *Tetrahedron Letters*, 2003, 44:8173-8175.
Sanz-Cobena, et al., "Gaseous emissions of N2O and NO and NO3—leaching from urea applied with urease and nitrification inhibitors to a maize (Zea mays) crop," *Agriculture, Ecosystems & Environment*, 2012, 149:64-73.
Sinclair et al., "Radiation Use Efficiency," *Advances in Agronomy* 1999, 65: 215-265.
Soares, et al., "Ammonia volatilization losses from surface-applied urea with urease and nitrification inhibitors," *Soil Biology and Biochemistry*, 2012, 52:82-89.
Subbarao, et al., "Scope and Strategies For Regulation of Nitrification in Agricultural Systems—Challenges and Opportunities," *Crit. Rev. Plant Sci.*, 2006, 25-303-335.
Trenkel, "Controlled-release and stabilized fertilizers in agriculture." *International fertilizer industry association* 1997, 11:1-156.
Upadhyay, "Urease inhibitors: A review." *Indian Journal of Biotechnology* 2012, 11:381-388.
Watson, et al., "Rate and mode of application of the urease inhibitor N-(n-butyl) thiophosphoric triamide on ammonia volatilization from surface-applied urea," *Soil Use and Management*, 2008, 24:246-253.
Wu, et al., "Guidelines For The Use of Fertilizers," *Chinese Agricultural Press*, 2000, 122-123. (English Translation).
Zaman, et al., "Effects of urease and nitrification inhibitors on the efficient use of urea for pastoral systems," *J. Soil Science and Plant Nutrition*, 2013, 59(4):649-659.
Zaman, et al., "Improving pasture growth and urea efficiency using N inhibitor, molybdenum and elemental Sulphur," *Journal of Soil Science and Plant Nutrition*, 2014, 14(1):245-257.
Dongpo et al., "Soil biological activities at maize seedling stage under application of slow/controlled release nitrogen fertilizers" *Chinese Journal of Applied Ecology* 2006, 17(6), 1055-1059 (English Translation of conclusion).
Office Action issued in Corresponding Chinese Application No. 201680051728.4, dated Jun. 3, 2021 (No English Translation provided).
Office Action issued in Corresponding Chinese Application No. 201911019580.8, dated Jul. 13, 2021 (English Translation provided).
Office Action issued in Corresponding Chinese Application No. 201880039588.8, dated Jul. 14, 2021 (English Translation provided).
Azeem, et al. "Review on materials & methods to produce controlled release coated urea fertilizer," *Journal of Controlled Release*, 2014, 181:11-21.
Babu, et al. "Current Progress on bio-based polymers and their future trends," *Progress in Biomaterials*, 2013, 2:8.
Extended European Search Report issued in counterpart European Patent Application No. 20166713.6, dated Nov. 11, 2020.
Extended European Search Report issued in European Application No. 1686688.7, dated Jun. 13, 2019.
International Search Report and Written Opinion issued in International Patent Application No. PCT/IB2017/050683, dated Jun. 20, 2017.
Lubkowski, "Coating Fertilizer Granules with Biodegradable Materials for Controlled Fertilizer Release," Environmental Engineering and Management Journal, 2014, 13:2573-2581.
Lookchem. "Hydroxypropyl methyl cellulose," https://www.lookchem.com/Hydroxypropyl-methyl-cellulose/ pp. 1-2, 2015.
Office Action issued in corresponding Chinese Patent Application No. 201680051728.4, dated Aug. 11, 2020.
Office Action issued in counterpart Chinese Patent Application No. 201680051745.8, dated Dec. 2, 2020.
Search Report issued in corresponding Chinese Patent Application No. 201680051745.8, dated Jul. 2, 2019.
Search Report issued in corresponding Chinese Patent Application No. 201680051728.4, dated Aug. 5, 2020.
Yixing, et al. "Application Technology of Novel Slow and Controlled Release Fertilizer," *China Three Gorges Press*, 2008, 1, pp. 90 and 92.
Yongkang, et al. "Modern Drying Technology," *Chemical Industry Press*, 2007, 1:719-722.
Martin R.J., et al.: Comparison of Agrotain-treated and standard urea on an irrigated dairy pasture, Proceedings of the New Zealand Grassland Association, vol. 70, 2008, Blenheim, pp. 91-94.
Office Action issued in counterpart New Zealand Patent Application No. 723446, dated Nov. 11, 2021.
Zhang J., et al.: Heat Capacity and Thermal Decomposition of Dicyandiamide, Thermochimica Acta, vol. 307, Issue 1, 1997, pp. 11-15, ISSN 0040-6031.
Office Action issued in corresponding Chinese Application No. 201880040046.2, dated Sep. 1, 2021.
Office Action issued in corresponding Chinese Application No. 202010394499.4, dated Oct. 9, 2021.
Office Action issued in corresponding Chinese Application No. 201680051728.4, dated Oct. 27, 2021.

(56) References Cited

OTHER PUBLICATIONS

Office Action and Search Report issued in Corresponding Chinese Application No. 201880040397.3, dated Mar. 30, 2022.

* cited by examiner

ENHANCED EFFICIENCY FERTILIZER WITH EMBEDDED POWDER COMPOSITION

CROSS REFERENCE TO RELATED APPLICATIONS

This application is a national phase application under 35 U.S.C. § 371 of International Application No. PCT/IB2018/052578, filed Apr. 12, 2018, which claims the benefit of priority of U.S. Provisional Patent Application No. 62/487,731, filed Apr. 20, 2017, which are hereby incorporated by reference in their entirety.

BACKGROUND OF THE INVENTION

A. Field of the Invention

The invention generally concerns fertilizer particles that include urease inhibitors and/or nitrification inhibitors. The inhibitors can be contained in a powder composition that includes at least a filler and is distributed within a solid urea matrix.

B. Description of Related Art

To increase crop yield and satisfy the growing needs of an increasing population, more fertilizers are being used in agriculture. However, continuous use of fertilizer can lead to nutrient imbalance and loss of soil fertility. In addition, extensive use of urea fertilizer, due to its rapid hydrolysis and nitrification in the soil by soil bacteria, can cause deterioration of soil health and other environmental problems such as greenhouse emissions and groundwater contamination.

Hydrolysis and nitrification of urea in soil can be counteracted by adding urease inhibitors and nitrification inhibitors to the fertilizer. Urease inhibitors reduce the amount of urea hydrolyzed, which reduces the amount of nitrogen lost through ammonia volatilization. Nitrification inhibitors reduce the rate of conversion of ammonium into nitrate, which also reduces the amount of nitrogen lost. Nitrification inhibitors are effective at enhancing efficiency of a variety of nitrogen fertilizers in addition to urea.

While use of urease inhibitors and nitrification inhibitors in fertilizers has been employed as a solution to the problems of urea hydrolysis and nitrification, there are certain difficulties in using these inhibitors. One problem is that some inhibitors are heat sensitive, which complicates the manufacturing process for fertilizers that include such inhibitors. For example, adding a heat-sensitive inhibitor to molten urea before granulation can cause substantial degradation of the inhibitor, as described in *Soil Use & Management*, 24:246 (2008). To compensate for this problem, some fertilizer manufacturers may add an excess of inhibitor to the urea melt, as in US 2015/0101379 to Gabrielson et al. This approach increases the cost of producing the fertilizer and still results in substantial thermal degradation of inhibitors while the inhibitors are exposed to molten urea.

SUMMARY OF THE INVENTION

A solution to the aforementioned problems has been disclosed herein below. In some embodiments, the solution resides in providing a fertilizer particle with a urease inhibitor and/or a nitrification inhibitor (also referred to collectively herein as "nitrogen stabilizers") that can be contained in a powder composition distributed throughout a solid urea matrix. The powder composition additionally can contain at least a filler material, which can be further defined as an anti-degradation agent. Without wishing to be bound by theory, it is believed that the filler materials disclosed herein can protect the nitrogen stabilizers during the manufacturing process of the fertilizer particles by absorbing heat, dispersing heat, and/or insulating the inhibitor from the heat of molten urea. The manufacturing process for the fertilizer particles involves providing a powder composition that can contain one or more inhibitors and a filler and fattening the powder composition in a granulation apparatus with a molten urea composition. This process has advantages over prior art methods in that it has lower cost and complexity while also protecting nitrogen stabilizers from thermal degradation more effectively than processes that involve adding the nitrogen stabilizers to molten urea before granulation.

Disclosed herein is a fertilizer particle that can contain a powder composition distributed within a solid urea matrix, wherein the powder composition can contain a filler and at least one of a urease inhibitor and/or a nitrification inhibitor, and wherein the urease inhibitor, when present, is less than 20 wt % of the powder composition, and the nitrification inhibitor, when present, is 10 to 50 wt % of the powder composition. It is a particular advantage of the fertilizer particles described herein that they can be made using less urease inhibitor than conventional fertilizer particles due to the urease inhibitor being included in a powder composition that can contain a filler, which can in some embodiments be further defined as an anti-degradation agent. The urease inhibitor, when present, can be between about 0.1 and 19.9 wt % or about 0.1, 0.5, 1, 2, 3, 4, 5, 6, 7, 8, 9, 10, 11, 12, 13, 14, 15, 16, 17, 18, 19, 19.5, or 19.9 wt % of the powder composition or between any two of these values. The nitrification inhibitor, when present, can be about 5, 6, 7, 8, 9, 10, 11, 12, 13, 14, 15, 16, 17, 18, 19, 20, 21, 22, 23, 24, 25, 30, 35, 40, 45, or 50 wt % of the powder composition or between any two of these values. In some embodiments, both inhibitors are present, and the combined amount of urease inhibitor and nitrification inhibitor is from about 0.1 to 50 wt % of the powder composition or is about 0.1, 0.5, 1.0, 2.0, 3.0, 4.0, 5.0, 6.0, 7.0, 8.0, 9.0, 10, 11, 12, 13, 14, 15, 16, 17, 18, 19, 20, 25, 30, 35, 40, 45, or 50 wt % or between any two of these values. In preferred embodiments, the urease inhibitor is less than 5 wt % of the powder composition and the nitrification inhibitor is less than 25 wt % of the powder composition. In some embodiments, the urease inhibitor is N-(n-butyl) thiophosphoric triamide (NBTPT). In some embodiments, the nitrification inhibitor is dicyandiamide (DCD). The powder composition distributed within the solid urea matrix can be distributed throughout the sold urea matrix, which means that there is no substantial portion of the solid urea matrix from which the powder composition is substantially or entirely absent. In other embodiments, a portion of the solid urea matrix is substantially free of the powder composition, while another portion of the solid urea matrix has the powder composition distributed therein.

In some embodiments, the powder composition distributed within the solid urea matrix can contain a urease inhibitor and does not contain a nitrification inhibitor. In some embodiments, the urease inhibitor is between about 0.1 and 5 wt % of the powder composition or is about 0.1, 0.5, 1.0, 1.5, 2.0, 2.5, 3.0, 3.5, 4.0, 4.5, or 5.0 wt % of the powder composition or is between any two of these values.

In some embodiments, the powder composition distributed within the solid urea matrix can contain a nitrification inhibitor and does not contain a urease inhibitor. In some embodiments, the urease inhibitor is between about 0.1 and 10 wt % of the powder composition or is about 0.1, 0.5, 1.0, 2.0, 3.0, 4.0, 5.0, 6.0, 7.0, 8.0, 9.0, 10 11, 12, 13, 14, 15, 16, 17, 18, 19, 20, 21, 22, 23, 24, 25, 30, 35, 40, 45, or 50 wt % of the powder composition or is between any two of these values.

In some embodiments, the urease inhibitor, which can be NBTPT, is about 0.05 to 0.11 wt % of the fertilizer particle. In some embodiments, the urease inhibitor is about 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.30, 0.40, or 0.50 wt % of the fertilizer particle or is between any two of these values.

In some embodiments, the nitrification inhibitor, which can be DCD, is about 0.5 to 10 wt % of the fertilizer particle or is about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5, 5, 5.5, 6.0, 6.5, 7.0, 7.5, 8.0, 8.5, 9.0, 9.5, or 10 wt % of the fertilizer particle or is between any two of these values. In embodiments that include both NBTPT and DCD in the fertilizer particle, the combined amount of these inhibitors can be between 0.1 and 15 wt % of the fertilizer particle, or about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.5, 5.0, 6.0, 7.0, 8.0, 9.0 or 10.0 wt % of the fertilizer particle or between any two of these values.

The amount of the filler can be between about 10 and 99 wt % of the powder composition that is distributed within the solid urea matrix. In some embodiments, the filler is further defined as an anti-degradation agent. In some embodiments, the filler is about 10, 15, 20, 25, 30, 35, 40, 45, 50, 55, 60, 65, 70, 75, 80, 85, 90, 95, or 99 wt % of the powder composition or is between any two of these values. The filler can also be about 2 to 8 wt % of the fertilizer particle. In some embodiments, the filler is about 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, or 20 wt % of the fertilizer particle. In some embodiments, the filler can contain one or more of silica, dried distillers grains with solubles (DDGS), kaolin, bentonite, rice husk, plaster of Paris, flour, biodegradable bleached wheat flour, starch, or gluten. The inclusion of a filler, and in particular an anti-degradation agent, in the fertilizer particles described herein helps to protect heat-labile urease inhibitors from being degraded during the manufacturing process, thus allowing less urease inhibitor to be added to achieve the same or better effective NBTPT concentrations in the final fertilizer particles.

The powder composition distributed within the solid urea matrix can further contain a pH buffering agent. A person of ordinary skill in the art will readily recognize that a variety of different pH buffering agents can be used. In some embodiments, the pH buffering agent can contain one or more of chalk powder, $CaCO_3$, MgO, $KH_2PO_4$, $NaHCO_3$, $Na_2CO_3$, $K_2CO_3$, or $MgCO_3$. The pH buffering agent can be about 2 to 8 wt % of the fertilizer particle or about 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or 10 wt % of the particle or between any two of those values.

In some embodiments, the fertilizer particle is substantially homogeneous. As used herein, a fertilizer particle is substantially homogeneous if the solid urea matrix is continuous and extends throughout the entire particle, even if there are some portions of the solid urea matrix that have a higher concentration of powder composition particles than other portions of the solid urea matrix. As an illustrative example, a fertilizer particle is not substantially homogenous if it has a core-shell structure in which a core particle is surrounded by a solid urea composition having a different formulation from the core particle. In some embodiments of the fertilizer particles, the solid urea matrix extends throughout the fertilizer particle.

In some embodiments, the fertilizer particle has a diameter of about 2 to 4 mm. The diameter can also be 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or 10 mm or between any two of these values.

In some embodiments, the powder composition distributed within the particle is between 2 and 8 wt % of the particle. The powder composition can also be 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, or 20 wt % of the particle or between any two of these values.

In some embodiments, the fertilizer particle can contain about 92 to 98 wt % of urea or about 71, 72, 73, 74, 75, 76, 77, 78, 79, 80, 81, 82, 83, 84, 85, 86, 87, 88, 89, 90, 91, 92, 93, 94, 95, 96, 97, 98, 99, or 99.5 wt % of urea or between any two of these values.

In some embodiments, the fertilizer particle can contain 2 to 8 wt % filler, 0.05 to 0.11 wt % NBTPT, 0.5 to 2 wt % DCD, 2 to 8 wt % pH buffering agent, and 92 to 98 wt % urea.

Also disclosed is a fertilizer particle that can contain a powder composition distributed throughout a solid urea matrix, wherein the powder composition can contain a filler and NBTPT, and wherein NBTPT is less than 5 wt % of the powder composition. In some embodiments, the filler is further defined as an anti-degradation agent.

Embodiments of the fertilizer particles disclosed herein can be characterized by the stability of the nitrogen in the particles when exposed to soils. In some embodiments, less than 20 wt % of the nitrogen in the fertilizer particle is lost via ammonia volatilization after being exposed to Greenville soil for 20 days. In some embodiments, the amount of nitrogen in the fertilizer particle lost via ammonia volatilization after being exposed to soil for 20 days is less than 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1 wt % or is between any two of those values. In some embodiments, the amount of nitrogen in the fertilizer particle lost via ammonia volatilization after being exposed to Greenville soil for 20 days is less than 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1 wt % or is between any two of those values. In some embodiments, less than 20 wt % of the nitrogen in the fertilizer particle is lost after being exposed to Crowley soil for 20 days. In some embodiments, the amount of nitrogen in the fertilizer particle lost after being exposed to Crowley soil for 20 days is less than 30, 29, 28, 27, 26, 25, 24, 23, 22, 21, 20, 19, 18, 17, 16, 15, 14, 13, 12, 11, 10, 9, 8, 7, 6, 5, 4, 3, 2, or 1 wt % or is between any two of those values.

Embodiments of the fertilizer particles disclosed herein can also be characterized by the stability of the urease inhibitor, such as NBTPT, in the particles. This can be measured by a stability test that involves measuring the concentration of the urease inhibitor in the particles before and after being stored in controlled conditions for a certain amount of time. In some embodiments, the fertilizer particle has at least 90% of the urease inhibitor remaining after storing the particle at 22° C. for 30 days in a sealed container as compared to the concentration measured immediately before such storage takes place. In some embodiments, the fertilizer particle has at least about 85, 86, 87, 88, 89, 90, 91, 92, 93, 94, 95, 96, 97, 98, or 99% of the urease inhibitor remaining or has an amount remaining that is between any two of those values.

The effect of the anti-degradation agent on the stability of the urease inhibitor during the manufacturing process can be ascertained by measuring the amount of inhibitor present in the fertilizer particles at various times after formation of the particle and comparing the measured amount to the amount that was originally added during the manufacturing process. For example, if NBTPT was added in a sufficient amount such that the fertilizer particle would end up with 0.2 wt % of NBTPT absent any degradation during manufacturing, the stability of NBTPT during manufacturing could be ascertained by comparing measured amounts of NBTPT in the fertilizer to the "expected," or "original" 0.2 wt % value. A manufacturing process and fertilizer composition that protects against degradation will result in fertilizer particles with higher amounts of NBTPT relative to the amount added during manufacturing. In some embodiments, the fertilizer particles of the invention have at least 80, 85, 90, 95, or 99% of the original amount of NBTPT remaining. Embodiments of the fertilizer particles of the invention can also be characterized by the amount of NBTPT degradation products present in the fertilizer particles. In some embodiments, the weight ratio of NBTPT to all NBTPT degradation products in the fertilizer particles of the invention is about 100:1, 50:1, 40:1, 30:1, 20:1, 15:1, 10:1, 9:1, 8:1, 7:1, 6:1, or 5:1 or is between any two of these values. In some embodiments, the fertilizer particles of the invention have less than about 0.005, 0.006, 0.007, 0.008, 0.009, 0.010, 0.011, 0.012, 0.013, 0.014, 0.015, 0.016, 0.017, 0.018, 0.019, 0.020, 0.025, 0.030, or 0.040 wt % of NBTPT degradation products relative to the weight of the fertilizer particle as a whole, or between any two of these values.

One specific product of NBTPT degradation is n-butylamine. In some embodiments, the weight ratio of NBTPT to n-butylamine in the fertilizer particles of the invention is at least about 200:1, 150:1, 100:1, 75:1, 60:1, 50:1, 40:1, 30:1, 20:1, 15:1, 10:1, 9:1, 8:1, 7:1, 6:1, or 5:1 or is between any two of these values. In some embodiments, the amount of n-butylamine in the fertilizer particles of the invention is less than about 0.001, 0.002, 0.003, 0.004, 0.005, 0.006, 0.007, 0.008, 0.009, 0.010, 0.011, 0.012, 0.013, 0.014, 0.015, 0.016, 0.017, 0.018, 0.019, 0.020, 0.025, 0.030, or 0.040 wt % or is between any two of those values. In some embodiments, the amounts and weight ratios indicated in this paragraph are the values as of 24 hours after the fertilizer particles were made by, for example, granulation; in some embodiments the amounts and weight ratios indicated are the values as of 30, 60, or 90 days after the fertilizer particles were made.

Also disclosed is a method of making a particulate fertilizer composition by (a) providing a powder composition that can contain a powdered filler and at least one of powdered urease inhibitor or nitrification inhibitor, and (b) contacting the powder composition with a composition that can contain molten urea under conditions sufficient to form a plurality of solid particles that can contain the powder composition and solid urea. In some embodiments, after step (b) the solid particles can contain the powder composition distributed within and/or distributed throughout the solid particles. In some embodiments, the contacting of step (b) includes spraying the molten urea composition onto the powder composition while the powder composition is being agitated in a granulation apparatus. The powdered urease inhibitor can be about 0.1 to 30 wt % of the powder composition of step (a). In some embodiments, the urease inhibitor is between about 0.1 and 5 wt % of the powder composition or is about 0.1, 0.5, 1.0, 1.5, 2.0, 2.5, 3.0, 3.5, 4.0, 4.5, or 5.0 wt % of the powder composition or is between any two of these values. The amounts of urease inhibitor required in the method of making fertilizer particles are much lower than is typically necessary. In conventional processes, excess amounts of heat-labile urease inhibitors, such as NBTPT, are used to compensate for the thermal degradation of the inhibitor during the manufacturing process. However, because of the action of the filler materials, which protect NBTPT from degradation during the manufacturing process, less NBTPT needs to be added during the manufacturing process described herein. The powdered nitrification inhibitor can be about 0.1 to 50 wt % of the powder composition of step (a) or between any two of these values. In some embodiments, the nitrification inhibitor is about 0.1, 0.5, 1.0, 2.0, 3.0, 4.0, 5.0, 6.0, 7.0, 8.0, 9.0, 10, 11, 12, 13, 14, 15, 16, 17, 18, 19, 20, 25, 30, 35, 40, 45, or 50 wt % of the powder composition or is between any two of these values. In some embodiments, the powder composition further can contain a pH buffering agent that can contain one or more of chalk powder, $CaCO_3$, MgO, $KH_2PO_4$, $NaHCO_3$, $Na_2CO_3$, $K_2CO_3$, or $MgCO_3$. In some embodiments, the solid particles can contain 2 to 8 wt % filler, 0.05 to 0.11 wt % NBTPT, 0.5 to 2 wt % DCD, 2 to 8 wt % pH buffering agent, and 92 to 98 wt % urea. In addition, all of the ingredients and amounts described herein for the fertilizer particles can be used in the methods of making fertilizer particles described herein.

In some embodiments of the method of making fertilizer particles, no urease inhibitor added to the molten urea composition before step (b) is performed, or no nitrification inhibitor is added to the molten urea composition before step (b) is performed. In some embodiments, neither urease inhibitor nor nitrification inhibitor is added to the molten urea composition before step (b) is performed. In some embodiments, a nitrification inhibitor is added to the molten urea composition before step (b) is performed.

In some embodiments, the method of making fertilizer particles results in decreased levels of degradation of nitrogen stabilizer as compared to methods in which the nitrogen stabilizer is added to molten urea before granulation or as compared to methods in which a filler or anti-degradation agent is not used. This can be measured by monitoring the nitrogen stabilizer concentrations, such as by HPLC. It can also be measured by monitoring amounts of degradation products of nitrogen stabilizers. In some embodiments, the method of making fertilizer particles results in a decrease in degradation of the nitrogen fertilizer of about 5, 10, 20, 30, 40, 50, 60, 70, 80, 90, 95, or 99% or between any two of these values.

In some embodiments, the amount of filler in the powder composition of step (a) is an amount that is effective to inhibit thermal degradation of a nitrogen stabilizer, for example NBTPT, in a method of making fertilizer particles. In some embodiments, the amount of filler used is effective to inhibit thermal degradation of a nitrogen stabilizer by 5, 10, 20, 30, 40, 50, 60, 70, 80, 90, 95, or 99% relative to comparable methods of making fertilizer particles in which the filler is not used or relative to comparable methods of making fertilizer particles in which the nitrogen stabilizer is added to molten urea before granulation. In some embodiments, the effective amount is about 20, 30, 40, 50, 60, 70, 80, 90, 95, or 99 wt % of the powder composition.

Also disclosed herein is a powder composition that can contain at least one of a nitrification inhibitor and a urease inhibitor, including combinations thereof, and at least one filler, wherein the urease inhibitor, when present, can contain less than 20 wt % of the powder composition and the nitrification inhibitor, when present, can contain about 10 to 50 wt % of the powder composition. In some embodiments, the urease inhibitor is NBTPT. In some embodiments, the nitrification inhibitor is DCD. The inhibitors can be present in the powder composition in the amounts described above for the powder composition in the fertilizer particles. The filler can be further defined as an anti-degradation agent and can be present in the amounts described above for the powder composition in the fertilizer particles. The powder composition can further contain a pH buffering agent in an amount between about 1 and 70 wt % of the powder composition or about 1, 5, 10, 15, 20, 25, 30, 35, 40, 45, 50, 55, 60, 65, or 70 wt % or between any two of these values. The powder composition can be contained in a fertilizer composition, which can include being contained in fertilizer particles or distributed within or throughout a solid urea matrix in a fertilizer composition. The powder composition can also be used in the methods of making fertilizer particles described herein.

Also disclosed are the following Embodiments 1 to 20 of the present invention. Embodiment 1 is a fertilizer particle comprising a powder composition distributed within a solid urea matrix, wherein the powder composition comprises a filler and at least one of a urease inhibitor and/or a nitrification inhibitor, and wherein the urease inhibitor or nitrification inhibitor is less than 20 wt % of the powder composition. Embodiment 2 is the fertilizer particle of Embodiment 1, wherein the urease inhibitor is less than 5 wt % of the powder composition and the nitrification inhibitor is less than 10 wt % of the powder composition. Embodiment 3 is the fertilizer particle of Embodiment 1 or 2, wherein the filler is between 10 and 99 wt % of the powder composition and is further defined as an anti-degradation agent. Embodiment 4 is the fertilizer particle of any one of Embodiments 1 to 3, wherein the powder composition is between 2 and 8 wt % of the particle. Embodiment 5 is the fertilizer particle of any one of Embodiments 1 to 4, wherein the urease inhibitor is N-(n-butyl) thiophosphoric triamide (NBTPT) and the nitrification inhibitor is dicyandiamide (DCD). Embodiment 6 is the fertilizer particle of any one of Embodiments 1 to 5, wherein the filler comprises one or more of silica, dried distillers grains with solubles (DDGS), kaolin, bentonite, rice husk, plaster of Paris, flour, biodegradable bleached wheat flour, starch, or gluten. Embodiment 7 is the fertilizer particle of any one of Embodiments 1 to 6, wherein the powder composition further comprises a pH buffering agent comprising one or more of chalk powder, $CaCO_3$, MgO, $KH_2PO_4$, $NaHCO_3$, $Na_2CO_3$, $K_2CO_3$, or $MgCO_3$. Embodiment 8 is the fertilizer particle of any one of Embodiments 1 to 7, wherein the particle is substantially homogeneous. Embodiment 9 is the fertilizer particle of any one of Embodiments 1 to 8, wherein the particle has a diameter of about 2 to 4 mm. Embodiment 10 is the fertilizer particle of any one of Embodiments 1 to 9, wherein the particle comprises 2 to 8 wt % filler, 0.05 to 0.11 wt % NBTPT, 0.5 to 2 wt % DCD, 2 to 8 wt % pH buffering agent, and 92 to 98 wt % urea. Embodiment 11 is the fertilizer particle of any one of Embodiments 1 to 10, wherein less than 20 wt % of the nitrogen in the fertilizer particle is lost via ammonia volatilization after being exposed to Greenville soil for 20 days. Embodiment 12 is the fertilizer particle of any one of Embodiments 1 to 11, wherein the fertilizer particle has at least 90% of the urease inhibitor remaining after storing the particle at 22° C. for 30 days in a sealed container. Embodiment 13 is the fertilizer particle of any one of Embodiments 1 to 12, comprising NBTPT and n-butylamine, wherein the weight ratio of NBTPT to n-butylamine is between about 30:1 and 15:1. Embodiment 14 is a fertilizer particle comprising a powder composition distributed throughout a solid urea matrix, wherein the powder composition comprises a filler and NBTPT, and wherein NBTPT is less than 5 wt % of the powder composition. Embodiment 15 is a method of making a particulate fertilizer composition, the method comprising: a) providing a powder composition comprising a powdered filler and at least one of powdered N-(n-butyl) thiophosphoric triamide (NBTPT) or powdered dicyandiamide (DCD); and b) contacting the powder composition with a composition comprising molten urea under conditions sufficient to form a plurality of solid particles comprising the powder composition and solid urea. Embodiment 16 is the method of Embodiment 15, wherein step (b) comprises spraying the composition comprising molten urea onto the powder composition while the powder composition is being agitated in a granulation apparatus. Embodiment 17 is the method of Embodiment 15 or 16, wherein the powder composition comprises no more than 5 wt % of NBTPT or no more than 30 wt % of DCD. Embodiment 18 is the method of any one of Embodiments 15 to 17, wherein after step (b) the powder composition is distributed throughout the solid particles. Embodiment 19 is the method of any one of Embodiments 15 to 18, wherein the powder composition further comprises a pH buffering agent comprising one or more of chalk powder, $CaCO_3$, MgO, $KH_2PO_4$, $NaHCO_3$, $Na_2CO_3$, $K_2CO_3$, or $MgCO_3$. Embodiment 20 is the method of any one of Embodiments 15 to 19, wherein the solid particles comprise 2 to 8 wt % filler, 0.05 to 0.11 wt % NBTPT, 0.5 to 2 wt % DCD, 2 to 8 wt % pH buffering agent, and 92 to 98 wt % urea.

The terms "about" or "approximately" as used herein are defined as being close to as understood by one of ordinary skill in the art. In one non-limiting embodiment, the terms are defined to be within 10%, preferably within 5%, more preferably within 1%, and most preferably within 0.5%.

The terms "wt %" or "vol. %" refers to a weight or volume percentage of a component, respectively, based on the total weight or the total volume of material, including the component. In a non-limiting example, 10 grams of component in 100 total grams of the material, including the 10 grams of component, is 10 wt % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, can mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The fertilizer compositions of the present invention can "comprise," "consist essentially of," or "consist of" particular ingredients, components, compositions, etc. disclosed throughout the specification. With respect to the transitional phrase "consisting essentially of," in one non-limiting aspect, a basic and novel characteristic of the fertilizer particles compositions of the present invention are their abilities to inhibit degradation of nitrogen stabilizers.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments can be combined with features from other embodiments. For example, features from one embodiment can be combined with features from any of the other embodiments. In further embodiments, additional features can be added to the specific embodiments described herein.

BRIEF DESCRIPTION OF THE DRAWINGS

Advantages of the present invention can become apparent to those skilled in the art with the benefit of the following detailed description and upon reference to the accompanying drawings. While the invention is susceptible to various modifications and alternative forms, specific embodiments thereof are shown by way of example in the drawings. The drawings may not be to scale.

DETAILED DESCRIPTION OF THE INVENTION

The fertilizer particles described herein contain nitrification and/or urease inhibitors in a powder composition distributed throughout a solid urea matrix. The powder composition can contain a filler material that provides protection against heat degradation of inhibitors during the manufacturing process. These and other non-limiting aspects of the present invention are discussed in further detail in the following sections.

A. Fertilizer Particle

Figure 1A:
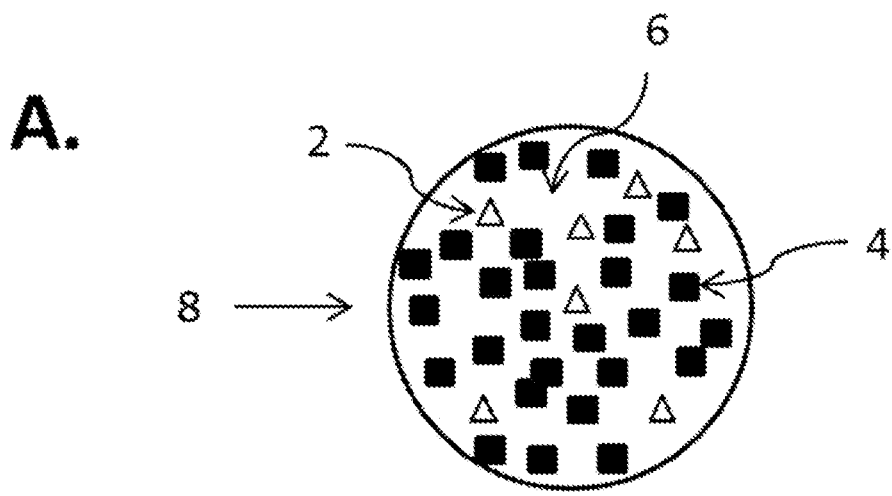
FIG. 1 illustrates a cross section of a fertilizer particle embodiment.

An illustrative cross section view of an embodiment of a fertilizer particle is depicted in FIG. 1A. In the illustrated embodiment, the fertilizer particle 8 can contain nitrogen stabilizer particles 2 and filler particles 4 embedded in a solid urea matrix 6. The nitrogen stabilizer particles 2 and filler particles 4 are part of a powder composition that is distributed within the solid urea matrix 6. The powder composition can also include a binder, a pH balancing agent, or other suitable ingredients that affect the physical properties of the fertilizer particle 8 or make the fertilizer particle 8 more effective at promoting plant growth. The filler particles 4 are present in the fertilizer particle 8 in higher amounts than the nitrogen stabilizer particles 2. The illustration in FIGS. 1A and 1B is not meant to depict the shapes or relative sizes of the nitrogen stabilizer particles 2 and filler particles 4.

Figure 1B:
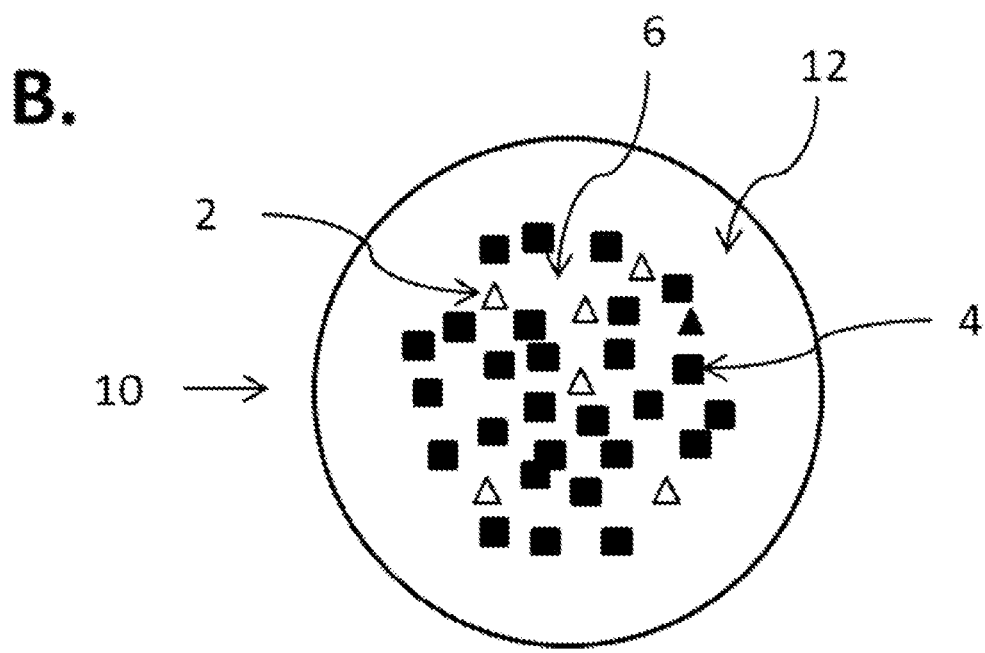

FIG. 1B shows an illustrative cross section view of another embodiment of a fertilizer particle 10. The difference between the embodiment illustrated FIG. 1A and that illustrated in FIG. 1B is that in the latter the solid urea matrix 6 has a portion 12 that does not have substantial amounts of the nitrogen stabilizer particles 2 or filler particles 4 embedded therein. While the fertilizer particle 10 is depicted as having a relatively abrupt transition between the portion of the urea matrix 6 that has the powder composition embedded therein and the portion 12 that does not, in some embodiments, the transition can be a gradient.

In some embodiments, the powder composition can form discrete clusters, or agglomerates of powder particles, that include both filler and inhibitor, with the clusters being distributed within the solid urea matrix.

While the fertilizer particles illustrated in FIGS. 1A and 1B have circular cross-sections, a variety of shapes are possible. For example, the fertilizer particle can have a spherical, puck, oval, or oblong shape. The fertilizer particles can also have a variety of sizes. In some embodiments, the fertilizer particle has a longest dimension between about 1 and 8 mm.

Fertilizer particles disclosed herein have desirable physical properties such as desired levels of abrasion resistance, particle strength, pelletizability, hygroscopicity, particle shape, and particle size distribution, which are important properties for the fertilizer particle. Accordingly, the ingredients of the powder composition, such as a filler, pH balancing agent, binders, etc., can be chosen to optimize these properties.

A particular application of embodiments disclosed herein is the stabilization of an inhibitor, such as, for example, NBTPT and/or DCD present in the fertilizer particle and of other fertilizer additives. Certain fertilizer additives are unstable and tend to degrade upon exposure to high temperatures, changes in pH (either acidic or basic), etc.

In conventional fertilizer technology, various fertilizer additives are mixed with a fertilizer using an "all in one" methodology. In these instances, fertilizers, fertilizer additives, excipients, and other ingredients are mixed together to form a fertilizer composition in the form of particles or granules. In most cases, granulation is performed at elevated temperatures such that the fertilizer composition is at a molten state. For example, the granulation temperature for molten urea is about 135° C. at about 35 atm pressure. Many fertilizer additives degrade, at least partially, under these conditions. Traditionally, these stability problems have been circumvented by using a large excess of fertilizer additives. Such methods, although in use, are sub-optimal and raise concerns regarding cost, efficacy, by-products, environmental waste, and green-house gases, etc.

The production processes disclosed herein, in which one or more fertilizer additives, including nitrogen stabilizers, can be contained in a powder composition that can contain one or more fillers, which in some embodiments can be defined as inhibitors of thermal degradation, provides a solution to the instability of fertilizer additives at higher temperatures. The ingredients in the powder composition can be chosen such that the resulting powder composition synergistically protects the fertilizer additives from high temperature degradation during the manufacturing process. This allows a lower amount of additives to be used during the manufacturing process.

Some of the fertilizer additives are unstable towards changes in pH, either in the composition during the manufacturing process, or after application to the soil. For example, depending on the circumstances, in the case of nitrogen containing fertilizers, after application, the soil environment can become acidic. Accordingly, fertilizer additives that are sensitive to the acidic pH degrade and will not reach their full performance capability. Including a large excess of fertilizer additives to compensate for the loss due to pH variations may not be successful, since the fertilizers, which are present in a large excess (in comparison to the fertilizer additives), continue to alter the pH of the soil environment. Also, some commercial products, such as SUPERU®, use organic solvents like NMP for adding fertilizer additives to the fertilizer composition. Such use is undesired and is avoided in the production of certain embodiments of the fertilizer particles described herein.

B. Urease Inhibitors and Nitrification Inhibitors

Urea is one of the most widely used fertilizers because of its high nitrogen content (46.6%). A number of urease and nitrification inhibitors has been developed to enhance the efficiency of urea fertilizer, but their application can be challenging due to stability problems in the soil under various conditions such as pH, temperature, precipitation, etc. For example, NBTPT is known to be a good inhibitor of urease but it is unstable under acidic pH. NBTPT also decomposes when exposed to high temperatures, such as the temperature of a urea melt (about 135-140° C.).

To overcome these issues, embodiments of the fertilizer particle are provided that contain a powder composition embedded within a solid urea matrix, with the powder composition that can contain a nitrogen stabilizer and a filler, which in some embodiments is further defined as an anti-degradation agent. The powder composition can also contain, in addition to a filler, a binder, a pH buffering agent, and other fertilizer additives. The pH buffering agent, for example $CaCO_3$, which can be provided in the form of chalk powder, is a material that can neutralize the acidity caused by urea hydrolysis, thereby preventing active agents, such as, for example, NBTPT, from being degraded when placed in soil with an acidic pH. Thus, the pH buffering agent can increase the efficacy of active agents, such as, for example, NBTPT, and also maintains soil pH.

The filler in the powder composition, which in some embodiments is further defined as an anti-degradation agent, is thought to protect the active ingredient, for example NBTPT, from being exposed to high temperatures during the granulation process, thereby preventing NBTPT from decomposing in the granulation process. For example, plaster of Paris (PoP)-containing powder compositions can prevent NBTPT degradation efficiently during the granulation process, which reduces the overall amount of NBTPT that must be added during the manufacturing process. In such a formulation, all active ingredients are protected in the powder composition by the PoP.

Additional inhibitors besides NBTPT and DCD can be included in the fertilizer particles described herein, including without limitation, 3,4-dimethylpyrazole phosphate (DMPP), thio-urea (TU), phenyl phosphorodiamidate (PPDA), 2-chloro-6-(trichloromethyl)-pyridine (Nitrapyrin), 5-ethoxy-3-trichloromethyl-1, 2, 4-thiadiazol (Terrazole), 2-amino-4-chloro-6-methyl-pyrimidine (AM), 2-mercapto-benzothiazole (MBT), or 2-sulfanimalamidothiazole (ST), or combinations thereof.

Additional fertilizer substances besides urea can be included in the fertilizer particles. Additional fertilizers can be chosen based on the particular needs of certain types of soil, climate, or other growing conditions to maximize the efficacy of the fertilizer particle in enhancing plant growth and crop yield. Additional additives can also be included in the fertilizer particles, including without limitation micronutrients, primary nutrients, and secondary nutrients. A micronutrient is a botanically acceptable form of an inorganic or organometallic compound such as boron, copper, iron, chloride, manganese, molybdenum, nickel, or zinc. A primary nutrient is a material that can deliver nitrogen, phosphorous, and/or potassium to a plant. Nitrogen-containing primary nutrients can include urea, ammonium nitrate, ammonium sulfate, diammonium phosphate, monoammonium phosphate, urea-formaldehyde, or combinations thereof. A secondary nutrient is a substance that can deliver calcium, magnesium, and/or sulfur to a plant. Secondary nutrients can include lime, gypsum, superphosphate, or a combination thereof. During manufacturing, the additional fertilizer substances described in this paragraph can be included in the powder composition, or they can be added to the molten urea before granulation, depending on whether it is necessary or desirable to protect the additional substances from thermal degradation.

C. Fillers

The fertilizer particles described herein contain a filler, which in some embodiments is further defined as an anti-degradation agent. Fillers can be chosen based on their ability to protect certain fertilizer additives, such as nitrogen stabilizers, from thermal degradation during the manufacturing process. Fillers can also affect the physical properties of the fertilizer particles such as crush strength and homogeneity and can alter the release kinetics of nitrogen stabilizers or micronutrients from the fertilizer particle. The amount and type of filler can be chosen based on its ability to prevent thermal degradation of fertilizer additives and on the desired final properties of the fertilizer particle.

In one aspect, the filler can contain plaster of Paris, flour, starch, gluten, kaolin, bentonite, or combinations thereof. Suitable flours include, but are not limited to, rice flour, wheat flour, and bleached wheat flour. Suitable starches include, but are not limited to, dextrin modified starches. The filler can also contain, for example, silica, dried distillers grains with solubles (DDGS), rice husk or other biomaterial, or a combination thereof.

In another aspect, the filler can contain a phosphate, a polyphosphate, a biodegradable polymer, or a combination thereof. Suitable phosphates include, but are not limited to, diammonium phosphate, and monoammonium phosphate. Suitable polyphosphates include, but are not limited to, ammonium polyphosphate. Suitable biodegradable polymers include, but are not limited to, polyacrylamide, polyacrylic acid, polyacrylonitrile, biodegradable polylactic acid and other biodegradable polymeric material such as polylactic acid, poly(3-hydroxypropionic acid), polyvinyl alcohol, poly e-caprolactone, poly L-lactide, poly butylene succinate, and biodegradable starch based polymers.

D. pH Buffering Agents

The fertilizer particle can also contain one or more pH buffering agents to help counteract the tendency of urea fertilizer to acidify the soil. Examples of suitable pH buffering agents include, but are not limited to, $CaCO_3$, MgO, $KH_2PO_4$, $NaHCO_3$, chalk powder, aluminum, magnesium hydroxide, aluminum hydroxide/magnesium hydroxide co-precipitate, aluminum hydroxide/sodium bicarbonate co-precipitate, calcium acetate, calcium bicarbonate, calcium borate, calcium carbonate, calcium bicarbonate, calcium citrate, calcium gluconate, calcium hydroxide, dibasic sodium phosphate, dipotassium hydrogen phosphate, dipotassium phosphate, disodium hydrogen phosphate, magnesium acetate, magnesium borate, magnesium bicarbonate, magnesium carbonate, magnesium hydroxide, magnesium lactate, magnesium oxide, magnesium phosphate, magnesium silicate, magnesium succinate, magnesium tartrate, potassium acetate, potassium carbonate, potassium bicarbonate, potassium borate, potassium citrate, potassium metaphosphate, potassium phthalate, potassium phosphate, potassium polyphosphate, potassium pyrophosphate, potassium succinate, potassium tartrate, sodium acetate, sodium bicarbonate, sodium borate, sodium carbonate, sodium citrate, sodium gluconate, sodium hydrogen phosphate, sodium hydroxide, sodium lactate, sodium phthalate, sodium phosphate, sodium polyphosphate, sodium pyrophosphate, sodium tartrate, sodium tripolyphosphate, synthetic hydrotalcite, tetrapotassium pyrophosphate, tetrasodium pyrophosphate, tripotassium phosphate, trisodium phosphate, and trometamol, and combinations thereof. A pH buffering agent, if used, can be part of the powder composition of the present invention, or can be added and mixed into the molten urea before granulation.

F. Matrix Composition

In one aspect, the powder composition is distributed throughout a matrix that can contain primarily urea. The urea matrix can also contain one or more additional nitrogen fertilizers. Suitable other nitrogen fertilizers can include, but are not limited to, ammonium nitrate, ammonium sulfate, DAP, MAP, urea-formaldehyde, ammonium chloride, and potassium nitrate.

G. Compositions

The fertilizer particles described herein can be contained in a composition useful for application to soil. In addition to the fertilizer particles, the composition can include other fertilizer compounds, micronutrients, primary nutrients, secondary nutrients, insecticides, herbicides, fungicides, and combinations thereof.

The fertilizer particles described herein can also be included in a blended composition that can contain other fertilizer granules. The other fertilizer granules can be granules of urea, Single Super Phosphate (SSP), Triple Super Phosphate (TSP), ammonium sulfate and the like.

H. Method of Making a Fertilizer Particle

Manufacturing processes of the fertilizer particles described herein generally include preparing a powder composition that can contain at least a nitrogen stabilizer and a filler and then contacting the powder composition with a molten urea composition under conditions sufficient to form a plurality of solid particles that can contain the powder composition embedded within a solid urea matrix. In some embodiments, the contacting step can be performed within a granulation apparatus. In such embodiments, the powder composition can be added to the granulation apparatus, and the molten urea composition can then be sprayed onto the powder composition while the powder composition is in motion. This process can also be referred to as "fattening" the powder composition. As the molten urea-containing composition is sprayed onto the powder composition, it cools and solidifies, resulting in a fertilizer particle having the powder composition embedded within a solid urea matrix. The resulting fertilizer particle can be of various sizes. In some embodiments, the fertilizer particle has a size between about 1 and 8 mm. In some other embodiments, molten urea can be added to the powder composition. In these embodiments, as the molten urea cools and solidifies, it results in a fertilizer particle having the powder composition embedded within a urea matrix.

The powder composition can be formed by mixing a nitrogen stabilizer powder with a filler powder, along with any other dry ingredients. This can be done before the powder composition is added to a granulation apparatus. In addition, the mixing can take place within the granulation apparatus before the fattening process begins.

Figure 2:
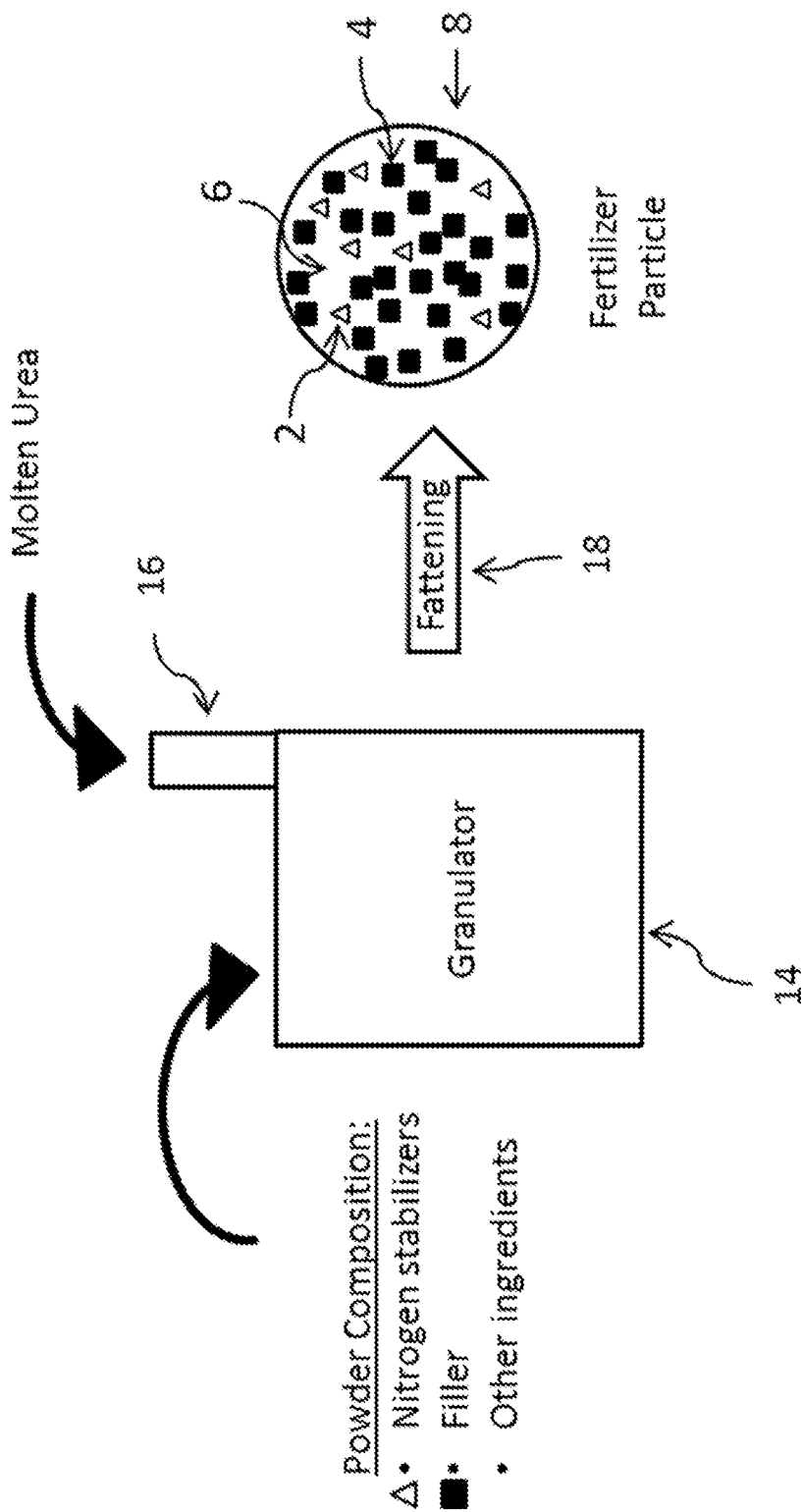
FIG. 2 depicts an embodiment of a process by which a fertilizer particle is produced.

FIG. 2 illustrates an embodiment of a process by which a fertilizer particle 8 can be produced. A powder composition that can contain nitrogen stabilizer particles 2 and filler particles 4 is placed in a granulator 14, which is turned on to set the powder composition in motion. Molten urea, which can also include additional additives, is then delivered into the granulator 14 through a pipe 16. Within the granulator 14, the molten urea is sprayed onto the powder composition, where it cools and solidifies in a process known as fattening 18. After fattening 18, the fertilizer particle 8 has the nitrogen stabilizer 2 and filler 4 embedded therein.

During the manufacturing process of the fertilizer particles, the fattening process "consumes" the powder composition: as molten urea is sprayed onto the agitated powder composition, the powder composition gets incorporated into growing fertilizer particles. The fattening process can continue for a time after the powder composition is fully incorporated into fertilizer particles, in which case the additional solid urea will not contain substantial amounts of the powder composition. This process would result in a fertilizer particle resembling that illustrated in FIG. 1B, in which the urea matrix 6 has a portion 12 that is substantially free of nitrogen stabilizer particles 2 and filler particles 4. On the other hand, if fattening is stopped at about the same time that all of the powder composition is incorporated into fertilizer particles, the fertilizer particles will more closely resemble that illustrated in FIG. 1A, with nitrogen stabilizer particles 2 and filler particles 4 present throughout substantially the entirety of the fertilizer particle 8. In some embodiments, there will be a gradient in which portions of the solid urea matrix 6 nearer the outside of the particle have a lower concentration of nitrogen stabilizer particles 2 and filler particles 4 than portions nearer the center.

The powder composition can be characterized by the sizes of the powder particles therein. In some embodiments, the average size of the powder particles is less than about 50, 100, 150, or 200 µm. In some embodiments, the powder particles have sizes between about 10 and 200 µm. In some embodiments, the powder does not include any particles having sizes above about 100, 200, 300, 400, 500, or 600 µm or does not include substantial amounts of particles having sizes above those values.

I. Methods of Using Fertilizer Particles

The fertilizer particles described herein can be used in methods of increasing the amount of nitrogen in soil and of enhancing plant growth. Such methods can include applying to the soil an effective amount of a composition that can contain the fertilizer particles. The method can include increasing the growth and yield of crops such as, for example, rice, wheat, corn, barley, oats, and soybeans.

The effectiveness of compositions that can contain the fertilizer particles described herein can be ascertained by measuring the amount of nitrogen in the soil at various times after applying the fertilizer composition to the soil. It is understood that different soils have different characteristics, which can affect the stability of the nitrogen in the soil. The effectiveness of a fertilizer composition can also be directly compared to other fertilizer compositions by carrying out a side-by-side comparison in the same soil under the same conditions. Compositions containing the fertilizer particles described herein can be compared directly to such fertilizers as AGROTAIN® or SUPERU®. AGROTAIN® is sold by Koch Fertilizer, LLC and is an NBTPT-containing liquid formulation, with NMP as the main solvent along with other additives to allow for spreading of this liquid onto urea granules, generally at the farm site. Thus, it requires an additional step before being used by the farmer and incorporates the toxic solvent NMP. Tremendous odor is evident during usage. SUPERU® is sold by Koch Fertilizer, LLC and is a formulation of urea containing both NBTPT and DCD prepared by adding these two inhibitors to the urea melt during granulation.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Prophetic Example 1

Methods of Making Fertilizer Particles and Analyzing their Properties

A. Materials

Technical grade urea was obtained from SABIC, Riyadh, Saudi Arabia. Plaster of Paris, chalk powder, and bleached wheat flour was obtained from local markets in Bengaluru, India. NBTPT powder was obtained from Samich (HK) Ltd., Hangzhou, China. DCD powder was obtained from Sigma Aldrich/AlzChem, Germany.

B. Procedure for Preparing Powder Composition

Powder compositions were prepared by mixing NBTPT powder, DCD powder, plaster of Paris, and combinations of other fillers described above. The powders were mixed mechanically. The amount of NBTPT in the powder composition was between 1 and 5 wt % relative to the weight of the complete powder composition. The amount of DCD was between 0 and 50 wt %. The amount of plaster of Paris was between 50 and 80 wt %. Chalk powder was added in an amount between 50 and 80 wt %. In some instances, no additional other fillers were used. In some instances, additional other fillers were used in varying amounts as well.

C. Procedure for Granulation

The powder composition was provided as described above. During the granulation process, active ingredients, such as the nitrogen stabilizers, were protected inside the powder composition by the filler materials used in the formulation. The powder composition was placed in the granulator. The powder composition was placed into motion and was sprayed with a urea melt inside the granulator to produce the fertilizer particle. The granulated fertilizer particles generally had a longest dimension of about 4 mm. The granulating process both fattened the powder composition with urea and dried the fertilizer granules.

The spray rate of the urea melt was controlled to control the agglomeration of fertilizer particles.

The granulation process parameters used are described in Table 1.

TABLE 1

| Process | Coating |
|---|---|
| Bin | Coating Bin |
| Nozzle | Bottom spray; Diameter 1.2 mm, Air cap 2.6 mm |
| Atomization air pressure | 0.8 bar |
| Distribution plate | Sieve plate with 58% free area |
| Sieve cloth | 1x; 25 µm mesh size |
| Nozzle heating (thermal oil temperature) | 160° C. |
| Liquid tank heating (thermal oil temperature) | 150° C. |
| Atomization air heating | 100° C. |
| Electrical trace heating (tube) | 160° C. |
| Valve I heating (in front of the nozzle) | 160° C. |
| Valve II heating (liquid tank discharge) | 160° C. |

D. Sample Analysis

The purity of NBTPT and DCD can be cross-checked by NMR, HPLC, and LCMS analysis.

Crush strength can be measured for some of the samples using a crush strength analyzer to determine the strength of the fertilizer particles.

The stability of inhibitors in the fertilizer particles can be measured using HPLC and LCMS.

The free and total moisture content of fertilizer particles can be measured using a moisture analyzer.

It is expected that the final fertilizer particles will have the following properties: crush strength (kgf): 1.68-3.60; abrasion analysis (wt loss %): 0.11-1.50; impact resistance (shattered granules %): 0.05-1.20; moisture analysis (wt %): 0.12-1; particle size distribution (granule): 2-4 mm (>90%); Biuret %: 1.05-3.8; and Nitrogen %: 43.3-46.3.

The nitrogen volatilization and nitrogen transformation (nitrification) will be measured in different soils and compared to urea alone and to products on the market such as AGROTAIN®, ESN®, and SUPERU®. A soil that is representative of a broader class of soil types can be used to measure the nitrogen volatilization and nitrification. Greenville soil and Crowley soil are two such representative soils. Other soils can also be used for the experiments described herein.

Greenville soil or Greenville clay-loam soil is typical of weathered tropical ultisols and is found in warm humid environments. The soil is classified as fine, kaolinitic, thermic Rhodic Kandiudults with a pH of 6.1-6. The soil has organic matter of 1.4%, total amount of nitrogen is about 0.06%, and the CEC is 5.2 cmol/kg. Accordingly, the soil has a low content of organic matter, and also low availability of sulfur and nitrogen. Thus, the soil is ideal for nitrogen and sulfur trials with fertilizers.

Crowley soil consists of very deep, somewhat poorly drained, very slowly permeable soils that formed in clayey fluviomarine deposits of the Pleistocene age. The soil exists in nearly level to very gently sloping soils and occurs on flat coastal plains terraces. The slope is dominantly less than 1 percent but ranges to up to 3 percent. The mean annual precipitation is about 1549 mm (61 in.), and the mean annual air temperature is about 20 degrees C. (68 degrees F.), where the soil is found. The soil is fine, smectitic, and thermic Typic Albaqualfs.

The nitrogen volatilization of various exemplary samples of fertilizer granules as compared to AGROTAIN®, ESN®, SUPERU®, and urea will be determined as the percentage of nitrogen loss via ammonia volatilization as compared to the amount of nitrogen applied or as the absolute mass of nitrogen lost via ammonia volatilization. It is expected that embodiments of the fertilizer particles disclosed herein will lose less than 20 wt % of the applied nitrogen after being exposed to soil for 20 days. It is also expected that embodiments of the fertilizer particles disclosed herein will lose less than 20 wt % of the applied nitrogen after being exposed to Greenville soil for 20 days and less than 20 wt % of the applied nitrogen after being exposed to Crowley soil for 20 days. It is also expected that embodiments of the fertilizer particles disclosed herein will have lower levels of ammonia volatilization and/or nitrogen loss than AGROTAIN®, ESN®, and/or SUPERU® tested under substantially identical conditions in a given soil, which can include Greenville soil, Crowley soil, or other soils.

The stability of NBTPT or other nitrogen stabilizers in the fertilizer particles can be monitored by measuring NBTPT concentrations in the particles after different storage times. This can be performed in a controlled environment to be able to make comparisons between fertilizer formulations. As demonstrated herein, it is expected that the fertilizer particles will have at least 90% of NBTPT remaining after storing the particles at 22° C. for 30 days in a sealed container. It is expected that, within 24 hours after granulation, the fertilizer particles will have at least 95% of NBTPT remaining relative to the amount added during manufacturing. As demonstrated herein, it is expected that, on the 30th day after granulation, the fertilizer particles will have at least 90% of NBTPT remaining relative to the amount added during manufacturing. It is expected that, within 24 hours after granulation and/or on the 30th day after granulation, the weight ratio of NBTPT to all NBTPT degradation products in the fertilizer particles will be at least 10:1. It is expected that, within 24 hours after granulation and/or on the 30th day after granulation, the weight ratio of NBTPT to n-butylamine will be at least 20:1.

Example 2

Stabilization of NBTPT Using an Anti-Degradation Agent

Two particulate fertilizer compositions with the same amount of added NBTPT were prepared according to the procedures described in Example 1. In one of the compositions, "Formulation A," the NBTPT was added as part of a powder composition having 39 wt % plaster of Paris, 31 wt % of chalk powder, 6 wt % of bleached wheat flour, 2 wt % of NBTPT, and 22 wt % of DCD. The powder composition and molten urea were used in amounts that resulted in an expected 0.19 wt % of NBTPT in the fertilizer granules. In a comparative composition, "Formulation B," NBTPT and DCD alone were fattened with molten urea, without using plaster of Paris, chalk powder, or bleached wheat flour. Enough NBTPT, DCD, and urea were used to result in an expected 0.19 wt % of NBTPT in the fertilizer granules. The amounts of NBTPT in the two formulations were periodically tested by HPLC. Table 2 below shows the amounts of NBTPT measured relative to the original 0.19 wt % amount.

TABLE 1

| Age of the granules in days | % NBTPT Recovered | |
| --- | --- | --- |
| | Formulation A | Comparative Formulation B |
| 30 | 95.3 | 72 |
| 90 | 88.5 | 68.7 |
| 135 | 82.9 | 67.6 |
| 165 | 83.1 | 68.1 |
| 210 | 81.6 | 65.8 |

As can be seen from Table 2, substantially more NBTPT was recovered from fertilizer particles when the NBTPT was added as part of a powder composition that included an anti-degradation agent during the manufacturing process.

The invention claimed is:

1. A fertilizer particle comprising a powder composition distributed within a solid urea matrix, wherein the powder composition comprises 2 to 8 wt % of a filler based on the weight of the fertilizer particle and 0.1 to 5 wt % of at least one of a urease inhibitor and/or a nitrification inhibitor based on the weight of the fertilizer particle, wherein the filler comprises plaster of paris and a flour, and wherein each of the urease inhibitor or nitrification inhibitor separately is less than 20 wt % of the powder composition.

2. The fertilizer particle of claim 1, wherein the powder composition comprises a urease inhibitor and a nitrification inhibitor, and the urease inhibitor is less than 5 wt % of the powder composition and the nitrification inhibitor is less than 10 wt % of the powder composition.

3. The fertilizer particle of claim 1, wherein the filler is between 10 and 99 wt % of the powder composition and is further defined as an anti-degradation agent.

4. The fertilizer particle of claim 1, wherein the powder composition is between 2.1 and 13 wt % of the particle.

5. The fertilizer particle of claim 1, wherein the urease inhibitor is N-(n-butyl) thiophosphoric triamide (NBTPT) and the nitrification inhibitor is dicyandiamide (DCD).

6. The fertilizer particle of claim 1, wherein the filler further comprises one or more of silica, dried distillers grains with solubles (DDGS), kaolin, bentonite, rice husk, starch, or gluten.

7. The fertilizer particle of claim 1, wherein the powder composition further comprises a pH buffering agent comprising one or more of chalk powder, $CaCO_3$, MgO, $KH_2PO_4$, $NaHCO_3$, $Na_2CO_3$, $K_2CO_3$, or $MgCO_3$.

8. The fertilizer particle of claim 7, wherein the pH buffering agent comprises chalk powder.

9. The fertilizer particle of claim 1, wherein the particle is substantially homogeneous.

10. The fertilizer particle of claim 1, wherein the particle has a diameter of about 2 to 4 mm.

11. The fertilizer particle of claim 1, wherein the particle comprises 0.05 to 0.11 wt % NBTPT, 0.5 to 2 wt % DCD, 2 to 8 wt % of a pH buffering agent, and 81.89 to 95.45 wt % urea.

12. The fertilizer particle of claim 1, wherein less than 20 wt % of nitrogen in the fertilizer particle is lost via ammonia volatilization after being exposed to Greenville soil for 20 days.

13. The fertilizer particle of claim 1, wherein the fertilizer particle has at least 90% of the urease inhibitor remaining after storing the particle at 22° C. for 30 days in a sealed container.

14. The fertilizer particle of claim 1, comprising NBTPT and n-butylamine, wherein the weight ratio of NBTPT to n-butylamine is between about 30:1 and 15:1.

15. The fertilizer particle of claim 1, wherein at least a portion of the powder composition is comprised in discrete aggregates of powder particles.

16. A fertilizer particle comprising a powder composition distributed throughout a solid urea matrix, wherein the powder composition comprises a filler and NBTPT, wherein the filler comprises plaster of paris and a flour, and wherein NBTPT is less than 5 wt % of the powder composition.

17. A method of making the fertilizer particle of claim 1, the method comprising:
   a) providing a powder composition comprising a powdered filler and at least one of powdered N-(n-butyl) thiophosphoric triamide (NBTPT) or powdered dicyandiamide (DCD), wherein the filler comprises plaster of paris and a flour; and
   b) contacting the powder composition with a composition comprising molten urea under conditions sufficient to form a plurality of solid particles comprising the powder composition and solid urea.

18. The method of claim 17, wherein step (b) comprises spraying the composition comprising molten urea onto the powder composition while the powder composition is being agitated in a granulation apparatus.

19. The method of claim 17, wherein the conditions of step (b) are sufficient to form the solid particles wherein the solid particles comprise the powder composition distributed throughout the solid particles.

\* \* \* \* \*